(12) United States Patent
Miyazaki et al.

(10) Patent No.: US 10,061,179 B2
(45) Date of Patent: Aug. 28, 2018

(54) OPTICAL MODULATOR AND OPTICAL TRANSMISSION APPARATUS

(71) Applicant: Sumitomo Osaka Cement Co., Ltd, Tokyo (JP)

(72) Inventors: Norikazu Miyazaki, Tokyo (JP); Toru Sugamata, Tokyo (JP)

(73) Assignee: SUMITOMO OSAKA CEMENT CO., LTD., Chiyoda-Ku, Tokyo (JP)

( * ) Notice: Subject to any disclaimer, the term of this patent is extended or adjusted under 35 U.S.C. 154(b) by 0 days.

(21) Appl. No.: 15/685,224

(22) Filed: Aug. 24, 2017

(65) Prior Publication Data
US 2018/0059503 A1 Mar. 1, 2018

(30) Foreign Application Priority Data

Aug. 24, 2016 (JP) .................. 2016-163980

(51) Int. Cl.
*G02F 1/035* (2006.01)
*G02F 1/225* (2006.01)
*H04B 10/50* (2013.01)
*H04B 10/516* (2013.01)
*G02F 1/21* (2006.01)

(52) U.S. Cl.
CPC ......... *G02F 1/2255* (2013.01); *H04B 10/501* (2013.01); *G02F 2001/212* (2013.01); *H04B 10/516* (2013.01)

(58) Field of Classification Search
CPC ............. G02F 1/2255; G02F 2001/212; H04B 10/501; H04B 10/516

USPC ............................................. 385/3
See application file for complete search history.

(56) References Cited

U.S. PATENT DOCUMENTS

| 8,712,195 B2 | 4/2014 | Sugiyama |
| 8,879,873 B2 * | 11/2014 | Goh .................. H04B 10/5161 385/3 |
| 9,107,297 B2 | 8/2015 | Sugiyama |
| 9,244,230 B2 | 1/2016 | Sugiyama |
| 9,436,018 B2 | 9/2016 | Sugiyama |

(Continued)

FOREIGN PATENT DOCUMENTS

| JP | 2003-233043 A | 8/2003 |
| JP | 2010-185979 A A1 | 8/2010 |

(Continued)

*Primary Examiner* — Ryan Lepisto
*Assistant Examiner* — Guy Anderson
(74) *Attorney, Agent, or Firm* — Taft Stettinius & Hollister LLP

(57) ABSTRACT

An optical modulator includes an optical modulation element including a plurality of signal electrodes and the like, a plurality of lead pins and the like for inputting radio frequency signals, and a relay substrate in which conductor patterns and the like that electrically connect the lead pins with the signal electrodes respectively are formed, the relay substrate is disposed so that a propagation direction of the radio frequency signals that have propagated through the lead pins is bent and guided to the conductor patterns, and the relay substrate is constituted so that widths of gaps between the plurality of conductor patterns in the optical modulator-side edge of the relay substrate is smaller than, preferably smaller than 50% of widths of gaps between the plurality of conductor patterns in the lead pin-side edge.

10 Claims, 7 Drawing Sheets

(56) References Cited

U.S. PATENT DOCUMENTS

| | | |
|---|---|---|
| 9,507,235 B2 | 11/2016 | Sugiyama |
| 9,535,213 B2 | 1/2017 | Sugiyama |
| 9,588,359 B2 * | 3/2017 | Sugiyama ............. G02F 1/0121 |
| 9,651,804 B2 | 5/2017 | Sugiyama et al. |
| 9,664,931 B1 * | 5/2017 | Yap ........................ G02F 1/011 |
| 9,709,871 B2 * | 7/2017 | Sugiyama ............... G02F 1/225 |
| 2003/0151792 A1 | 8/2003 | Kaitoh et al. |
| 2006/0228065 A1 * | 10/2006 | Burns .................. G02F 1/0356 |
| | | 385/3 |
| 2009/0237903 A1 * | 9/2009 | Onodera ............... G02F 1/1345 |
| | | 361/780 |
| 2011/0268382 A1 | 11/2011 | Takemura et al. |
| 2012/0051683 A1 * | 3/2012 | Sugiyama ............. G02F 1/0327 |
| | | 385/1 |
| 2013/0027762 A1 * | 1/2013 | Sugiyama ............. H05K 1/0215 |
| | | 359/245 |
| 2014/0119745 A1 * | 5/2014 | Sugiyama ............. G02F 1/2255 |
| | | 398/188 |
| 2014/0133794 A1 * | 5/2014 | Kono ..................... G02F 1/225 |
| | | 385/3 |
| 2015/0253593 A1 * | 9/2015 | Sugiyama ............. G02F 1/0121 |
| | | 385/40 |
| 2015/0261063 A1 | 9/2015 | Sugiyama |
| 2015/0293427 A1 * | 10/2015 | Goi ........................ G02F 1/025 |
| | | 385/3 |
| 2015/0331298 A1 * | 11/2015 | Yagi ....................... G02F 1/2255 |
| | | 385/2 |
| 2015/0362823 A1 * | 12/2015 | Sugiyama ............... G02F 1/225 |
| | | 385/3 |
| 2016/0054639 A1 * | 2/2016 | Kono ..................... G02F 1/2255 |
| | | 385/2 |
| 2016/0161771 A1 * | 6/2016 | Sugiyama et al. ... G02B 6/4201 |
| | | 385/3 |
| 2016/0216539 A1 * | 7/2016 | Sugiyama ............. G02F 1/0316 |
| 2017/0212402 A1 | 7/2017 | Ishii et al. |

FOREIGN PATENT DOCUMENTS

| | | |
|---|---|---|
| JP | 2011-209456 A | 10/2011 |
| JP | WO 2010/021193 A1 | 1/2012 |
| JP | 2012048121 A | 3/2012 |
| JP | 2012105104 A | 5/2012 |
| JP | 2013029791 A | 2/2013 |
| JP | 2014-199370 A A1 | 10/2014 |
| JP | 2015169798 A | 9/2015 |
| JP | 2015170729 A | 9/2015 |
| JP | 2015172682 A | 10/2015 |
| JP | 2015172683 A | 10/2015 |
| JP | 2016001284 A | 1/2016 |
| JP | 2016020928 A | 2/2016 |
| JP | 2016109941 A | 6/2016 |
| JP | 2016-139723 A A1 | 8/2016 |
| JP | 2017-134131 A | 8/2017 |

\* cited by examiner

A PORTION DETAIL

CROSS-SECTIONAL VIEW IN DIRECTION OF IIB-IIB LINE

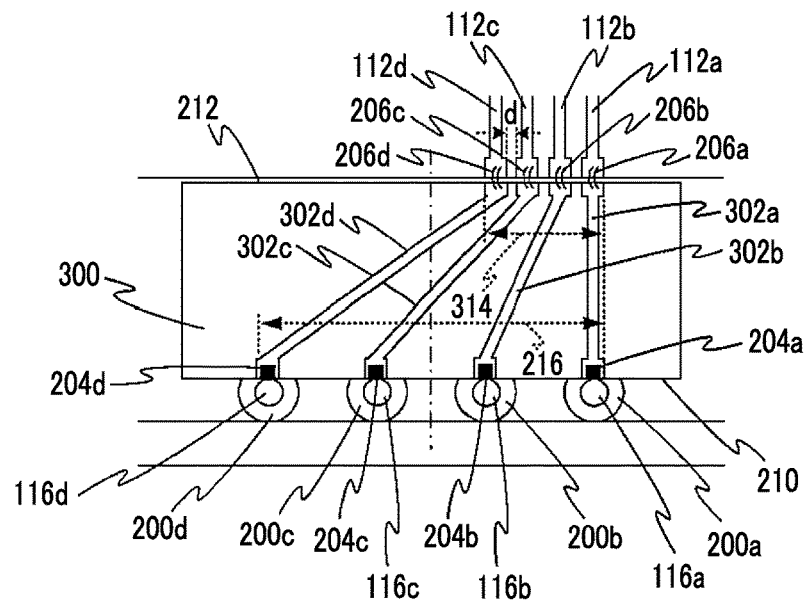
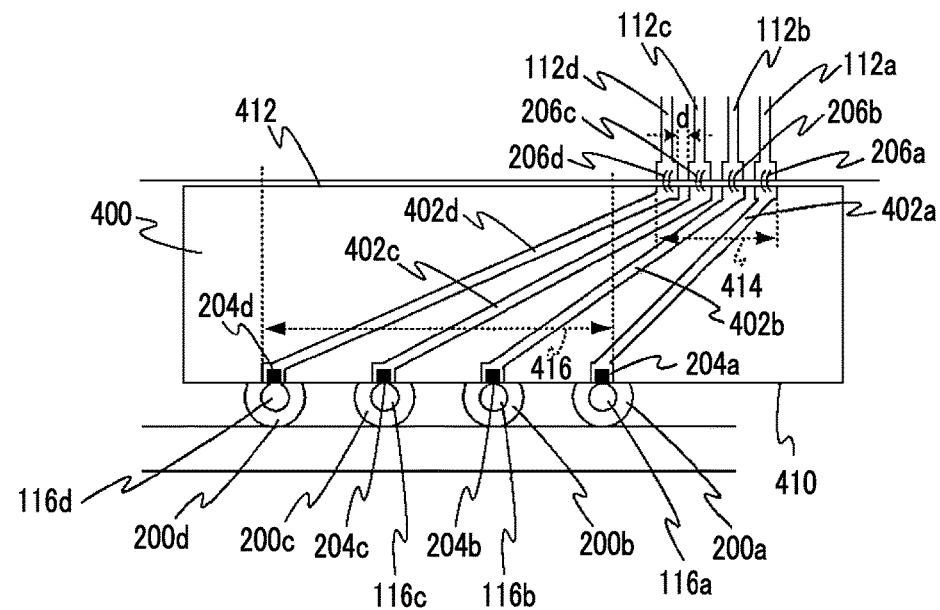

C PORTION DETAIL

CROSS-SECTIONAL VIEW IN DIRECTION OF IXB-IXB LINE

OPTICAL MODULATOR AND OPTICAL TRANSMISSION APPARATUS

CROSS-REFERENCE TO RELATED APPLICATIONS

This application claims the benefit of Japanese Patent Application No. 2016-163980 filed Aug. 24, 2016, the disclosure of which is herein incorporated by reference in its entirety.

BACKGROUND OF THE INVENTION

Field of the Invention

The present invention relates to an optical modulator and particularly to an optical modulator including a relay substrate that relays a lead pin for inputting radio frequency signals, which is provided in a package case, and an electrode of an optical modulation element and an optical transmission apparatus using the optical modulator.

Description of Related Art

In high-frequency/high-capacity optical fiber communication systems, optical modulators embedded with waveguide-type optical modulation elements are frequently used. Among these, optical modulation elements in which $LiNbO_3$ (hereinafter, also referred to as LN) having an electro-optic effect is used for substrates cause only a small light loss and are capable of realizing broad optical modulation characteristics and are thus widely used for high-frequency/high-capacity optical fiber communication systems.

In an optical modulation element in which this LN substrate is used, Mach-Zehnder-type optical waveguides, RF electrodes for applying radio frequency signals, which are modulation signals, to the optical waveguides, and bias electrodes for performing a variety of adjustments for favorably maintaining modulation characteristics in the waveguides are provided. In addition, these electrodes provided on the optical modulation element are connected to a circuit substrate on which electronic circuits for causing modulation operations in the optical modulator are mounted via lead pins or connectors provided in a package case of the optical modulator which houses the optical modulation element.

Regarding modulation methods in optical fiber communication systems, in response to the recent trend of an increase in transmission capacity, transmission formats of multilevel modulation and transmission formats achieved by incorporating polarization multiplexing into multilevel modulation such as Quadrature Phase Shift Keying (QPSK) or Dual Polarization-Quadrature Phase Shift Keying (DP-QPSK) has become mainstream and been used in core optical transmission networks and also has been introduced into metro networks.

Optical modulators performing QPSK modulation (QPSK optical modulators) or optical modulators performing DP-QPSK modulation (DP-QPSK optical modulators) include a plurality of Mach-Zehnder-type optical waveguides having a nested structure, which is termed a so-called nest-type structure, and include a plurality of radio frequency signal electrodes and a plurality of bias electrodes (for example, refer to Japanese Laid-open Patent Publication No. 2016-109941), which creates a tendency of an increase in the sizes of package cases of the optical modulators. However, in recent years, conversely, a demand for the size reduction of the modulators has been intensifying.

As a measure for satisfying the above-described demand for size reduction, an optical modulator which can be electrically connected to external circuit substrates by replacing a push-on-type coaxial connector provided in the package case of an optical modulator of the related art as an interface of the RF electrode by the same lead pins as the interfaces for the bias electrode and a flexible printed circuit (FPC) which is electrically connected to these lead pins is proposed (for example, refer to Japanese Laid-open Patent Publication No. 2016-109941).

For example, in a DP-QPSK optical modulator, an optical modulation element constituted of four Mach-Zehnder-type optical waveguides respectively having RF electrodes is used. In this case, four push-on-type coaxial connectors provided in the package case of the optical modulator inevitably increase the size of the package case, but the use of the lead pins and FPCs instead of the coaxial connectors enables size reduction.

In addition, since the lead pins in the package case of the optical modulator and a circuit substrate on which electronic circuits (driving circuits) for causing modulation operations in the optical modulator are mounted are connected to each other via the FPC, it is not necessary to perform the excess length treatment of coaxial cables used in the related art, and it is possible to decrease the installation space of the optical modulator in optical transmission apparatuses.

In the above-described optical modulator including the lead pins for inputting high-frequency electrical signals in the package case, generally, the lead pins and the electrodes of the optical modulation element housed in the package case are connected to each other via a relay substrate disposed in the package case (for example, refer to PTL 1).

FIG. 8A, FIG. 8B, and FIG. 8C are views illustrating an example of the constitution of the above-described optical modulator of the related art. Here, FIG. 8A is a plan view illustrating an optical modulator 800 of the related art mounted on a circuit substrate 830, FIG. 8B is a side view of the optical modulator 800 of the related art, and FIG. 8C is a bottom view of the present optical modulator 800 of the related art. The present optical modulator 800 includes an optical modulation element 802, a package case 804 accommodating the optical modulation element 802, a flexible printed circuit (FPC) 806, an optical fiber 808 for making light incident on the optical modulation element 802, and an optical fiber 810 guiding light output from the optical modulation element 802 to the outside of the package case 804.

The optical modulation element 802 is, for example, a DP-QPSK optical modulator including four Mach-Zehnder-type optical waveguides provided on an LN substrate and four radio frequency electrodes (RF electrodes) 812a, 812b, 812c, and 812d which are respectively provided on the Mach-Zehnder-type optical waveguides and modulate light waves propagating through the optical waveguides.

The package case 804 is constituted of a case 814a and a cover 814b to which the optical modulation element 802 is fixed. Meanwhile, in order to facilitate the understanding of the constitution in the package case 804, in FIG. 8A, the cover 814b is only partially illustrated in the left side of the drawing.

The case 804a is provided with four lead pins 816a, 816b, 816c, and 816d. These lead pins 816a, 816b, 816c, and 816d are sealed with glass sealing portions 900a, 900b, 900c, and 900d (described below), extend outside from the bottom surface (the surface illustrated in FIG. 8C) of the package case 804, and are connected to through-holes a formed on the FPC 806 with solders and the like.

One end of each of the lead pins 816a, 816b, 816c, and 816d is electrically connected to each of the RF electrodes 812a, 812b, 812c, and 812d on the optical modulation element 802 via the relay substrate 818.

The other end of each of the RF electrodes 812a, 812b, 812c, and 812d is electrically terminated using a terminator 820.

FIG. 9A is a partial detail view of a C portion of the optical modulator 800 illustrated in FIG. 8A, and FIG. 9B is a cross-sectional view of the optical modulator 800 in a direction of a IXB-IXB line in FIG. 8A. The lead pins 816a, 816b, 816c, and 816d are glass terminals, extend toward the outside of the package case 804 from the inside of the package case 804 respectively through the glass sealing portions 900a, 900b, 900c, and 900d provided in the case 814a, protrude from the bottom surface (the surface illustrated in FIG. 8C) of the package case 804, and are solder-fixed to the through-holes in the FPC 806.

The lead pins 816a, 816b, 816c, and 816d are disposed in the vicinity of a side (lead pin-side edge 910) of the relay substrate 818 on the lower side of FIG. 9A (the left side of the relay substrate 818 in FIG. 9B), and are electrically connected to conductor patterns 902a, 902b, 902c, and 902d provided on the relay substrate 818 with solders 904a, 904b, 904c, and 904d respectively.

In addition, the conductor patterns 902a, 902b, 902c, and 902d are electrically connected to the RF electrodes 812a, 812b, 812c, and 812d in the lower end portion in the drawing of the optical modulation element 802 (the left end of the optical modulation element 802 in FIG. 9B), which are disposed in the vicinity of a side (modulator-side edge 912) of the relay substrate 818 on the upper side of FIG. 9A (the right side of the relay substrate 818 in FIG. 9B) by, for example, metal wires 906a, 906b, 906c, and 906d respectively.

The conductor patterns 902a, 902b, 902c, and 902d formed on the relay substrate 818 are constituted as linear patterns that are parallel to each other in order to minimize the signal propagation loss and the skew (propagation delay time difference) by minimizing the propagation distance from the respective lead pins 816a, 816b, 816c, and 816d to the respective RF electrodes 812a, 812b, 812c, and 812d corresponding to the lead pins 816a, 816b, 816c, and 816d. Therefore, the optical modulator 800 is constituted so that the intervals among the respective lead pins 816a, 816b, 816c, and 816d and the intervals among the respective RF electrodes 812a, 812b, 812c, and 812d are the same as each other.

Due to the above-described constitution, in the optical modulator 800, high-frequency electrical signals input to the lead pins 816a, 816b, 816c, and 816d from conductor patterns 832a, 832b, 832c, and 832d formed on the circuit substrate 830 via the FPC 806 are input to the RF electrodes 812a, 812b, 812c, and 812d in the modulation element 802 via the relay substrate 818.

However, in the constitution of the optical modulator of the related art, when high-frequency electrical signals propagating through the lead pins 816a, 816b, 816c, and 816d are input to the conductor patterns 902a, 902b, 902c, and 902d in the relay substrate 818 from the lead pins 816a, 816b, 816c, and 816d, the propagation direction of the high-frequency electrical signals bends, and thus, in the bent portion, some of the high-frequency electrical signals are likely to propagate in a spatial propagation mode and radiate.

That is, generally, in order to facilitate the electric connection between the lead pins and the circuit substrate 830 via the FPC 806, the lead pins 816a, 816b, 816c, and 816d are disposed so as to extend downwards perpendicular to the lower surface of the package case 804 (therefore, perpendicular to the lower surface of the case 814a). Meanwhile, the surface of the relay substrate 818 is disposed in a direction along the lower surface of the case 814a so that the relay substrate 818 is stably fixed and housed in the package case 804. Therefore, the propagation direction of high-frequency electrical signals input from the conductor patterns 832a, 832b, 832c, and 832d in the circuit substrate 830 via the FPC 840 bends so that the high-frequency electrical signals bend almost at right angles from the lead pins 816a, 816b, 816c, and 816d toward the conductor patterns 902a, 902b, 902c, and 902d in the relay substrate 818, and, in the bent portion, some of the power thereof is likely to be radiated in the space.

In addition, the radiated radio frequency signals may be coupled to the RF electrodes 812a, 812b, 812c, and 812d disposed at locations facing the bent portion with the relay substrate 818 sandwiched between the bent portion and the RF electrodes, may affect the operation of the optical modulation element 802 as radiation noise, and may adversely affect the propagation characteristics of optical signals modulated using the optical modulation element 802.

SUMMARY OF THE INVENTION

Due to the above-described background, in optical modulators including a relay substrate that relays lead pins for inputting radio frequency signals and electrodes of an optical modulation element, it is desirable to effectively suppress the influence of radiation noise generated from electrical connection portions between the lead pins and the relay substrate on modulation operation.

An aspect of the present invention is an optical modulator including an optical modulation element including a plurality of signal electrodes, a plurality of lead pins for inputting radio frequency signals, and a relay substrate in which conductor patterns that electrically connect the lead pins with the signal electrodes are formed. The optical modulator is constituted so that at least one of widths of gaps between the plurality of conductor patterns in an optical modulator-side edge of the relay substrate is smaller than at least one width of widths of gaps between the plurality of conductor patterns in a lead pin-side edge.

According to the aspect of the present invention, in the relay substrate, the widths of the gaps between the plurality of conductor patterns in the optical modulator-side edge of the relay substrate are smaller than 50% of the widths of the gaps between the plurality of conductor patterns in the lead pin-side edge.

According to the aspect of the present invention, the relay substrate is constituted so that a central line of a disposition range of the conductor patterns in the optical modulator-side edge of the relay substrate coincides with a central line of a disposition range of the conductor patterns in the lead pin-side edge of the relay substrate.

According to the aspect of the present invention, in the relay substrate, the disposition range of the conductor patterns in the optical modulator-side edge of the relay substrate is included in a range of the optical modulator-side edge corresponding to the disposition range of the conductor patterns in the lead pin-side edge of the relay substrate, and one end portion of the disposition range in the lead pin-side edge is disposed at a location in the lead pin-side edge corresponding to one end portion of the disposition range in the optical modulator-side edge.

According to the aspect of the present invention, in the relay substrate, a part of the disposition range of the conductor patterns in the optical modulator-side edge of the relay substrate is provided outside a range of the optical modulator-side edge corresponding to the disposition range of the conductor patterns in the lead pin-side edge of the relay substrate.

According to the aspect of the present invention, in the relay substrate, all of the disposition range of the conductor patterns in the optical modulator-side edge of the relay substrate is provided outside the range of the optical modulator-side edge corresponding to the disposition range of the conductor patterns in the lead pin-side edge of the relay substrate.

According to the aspect of the present invention, in the relay substrate, a width of the disposition range of the plurality of conductor patterns in the optical modulator-side edge of the relay substrate is 50% or less of a width of the disposition range of the plurality of conductor patterns in the lead pin-side edge of the relay substrate.

According to the aspect of the present invention, the plurality of lead pins are disposed at equal intervals or unequal intervals.

Another aspect of the present invention is an optical transmission apparatus including any one of the above-described optical modulators and an electronic circuit that outputs electrical signals for causing modulation operation in the optical modulator.

BRIEF DESCRIPTION OF THE DRAWINGS

FIG. 3 is a view illustrating a first modification example of a relay substrate in the optical modulator according to the first embodiment illustrated in FIG. 2A.

FIG. 4 is a view illustrating a second modification example of the relay substrate in the optical modulator according to the first embodiment illustrated in FIG. 2A.

DETAILED DESCRIPTION OF THE INVENTION

Hereinafter, embodiments of the present invention will be described with reference to the accompanying drawings.

<First Embodiment>

Figure 1A:
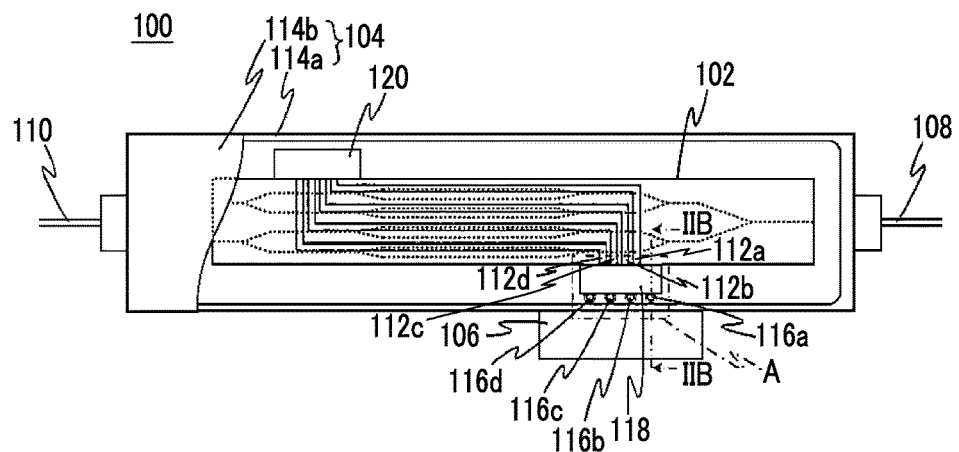
FIG. 1A is a plan view of an optical modulator illustrating a constitution of the optical modulator according to a first embodiment of the present invention.
Figure 1B:
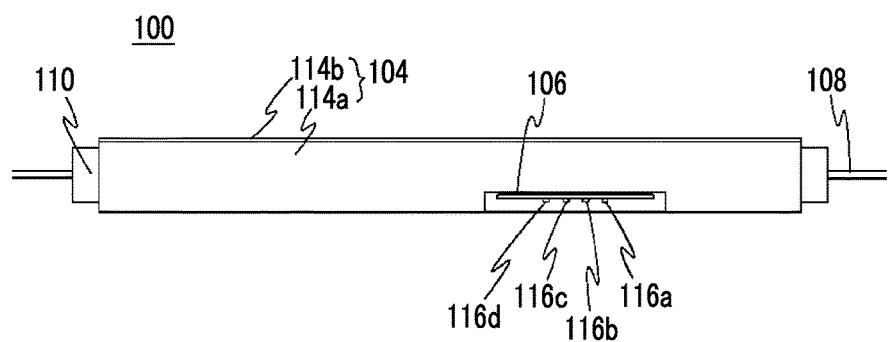
FIG. 1B is a side view of the optical modulator illustrating the constitution of the optical modulator according to the first embodiment of the present invention.
Figure 1C:
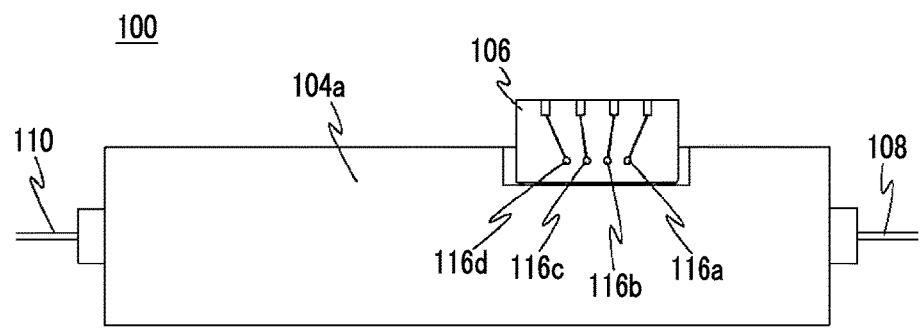
FIG. 1C is a bottom view of the optical modulator illustrating the constitution of the optical modulator according to the first embodiment of the present invention.

FIG. 1A, FIG. 1B, and FIG. 1C are views illustrating the constitution of an optical modulator according to a first embodiment of the present invention. Here, FIG. 1A, FIG. 1B, and FIG. 1C are respectively a plan view, a side view, and a bottom view of the present optical modulator.

The present optical modulator 100 includes an optical modulation element 102, a package case 104 accommodating the optical modulation element 102, a flexible printed circuit (FPC) 106, an optical fiber 108 for making light incident on the optical modulation element 102, and an optical fiber 110 guiding light output from the optical modulation element 102 to the outside of the package case 104.

The optical modulation element 102 is, for example, a DP-QPSK optical modulator including four Mach-Zehnder-type optical waveguides provided on an LN substrate and four radio frequency electrodes (RF electrodes) 112a, 112b, 112c, and 112d which are respectively provided on the Mach-Zehnder-type optical waveguides and modulate light waves propagating through the optical waveguides. Two light rays output from the optical modulation element 102 are polarization-synthesized using, for example, a lens optical system (not illustrated) and are guided to the outside of the package case 104 through the optical fiber 110.

The package case 104 is constituted of a case 114a and a cover 114b to which the optical modulation element 102 is fixed. Meanwhile, in order to facilitate the understanding of the constitution in the package case 104, in FIG. 1A, the cover 114b is only partially illustrated in the left side of the drawing; however, in actual cases, the cover 114b is disposed so as to fully cover the box-shaped case 114a and airtightly seals the inside of the package case 104.

The case 104a is provided with four lead pins 116a, 116b, 116c, and 116d. These lead pins 116a, 116b, 116c, and 116d are, for example, glass terminals, extend outside from the bottom surface (the surface illustrated in FIG. 1C) of the package case 104, and are connected to through-holes a formed on the FPC 106 with solders and the like.

Each of the lead pins 116a, 116b, 116c, and 116d is electrically connected to one end of each of RF electrodes 112a, 112b, 112c, and 112d on the optical modulation element 102 via the relay substrate 118. Meanwhile, the constitution of the relay substrate 118 will be described below.

The other end of each of the RF electrodes 112a, 112b, 112c, and 112d is terminated using a terminator 120.

Figure 2A:
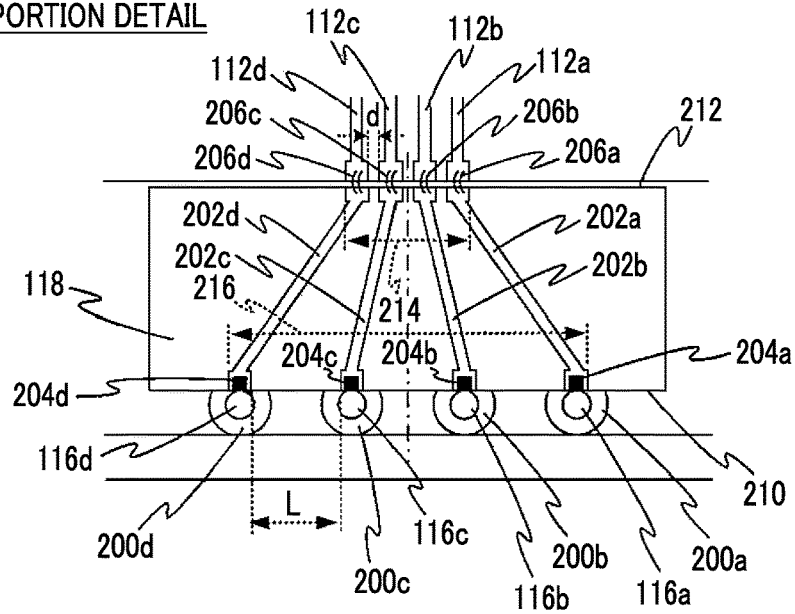
FIG. 2A is a partial detail view of an A portion of the optical modulator illustrated in FIG. 1A.
Figure 2B:
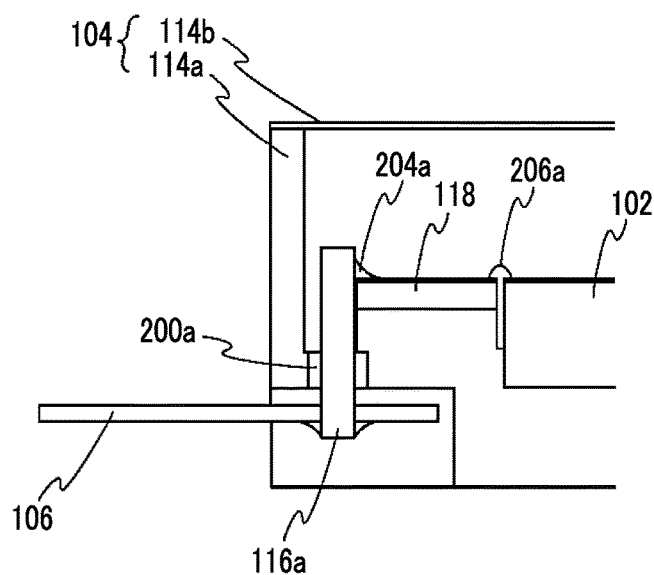
FIG. 2B is a cross-sectional view of the optical modulator in a direction of a IIB-IIB line in FIG. 1A.

FIG. 2A is a partial detail view of an A portion of the optical modulator 100 illustrated in FIG. 1A, and FIG. 2B is a cross-sectional view of the optical modulator 100 in a direction of a IIB-IIB line in FIG. 1A. The lead pins 116a, 116b, 116c, and 116d are glass terminals, extend toward the outside of the package case 104 from the inside of the package case 104 respectively via the glass sealing portions 200a, 200b, 200c, and 200d provided in the case 104a, protrude from the bottom surface (the surface illustrated in FIG. 1C) of the package case 104, and are solder-fixed to the through-holes in the FPC 106.

The lead pins 116a, 116b, 116c, and 116d are disposed in the vicinity of a side (lead pin-side edge 210) of the relay substrate 118 on the lower side of FIG. 2A (the left side of the relay substrate 118 in FIG. 2B), and are electrically connected to conductor patterns 202a, 202b, 202c, and 202d provided on the relay substrate 118 with solders 204a, 204b, 204c, and 204d respectively.

In addition, the conductor patterns 202a, 202b, 202c, and 202d are electrically connected to RF electrodes 112a, 112b, 112c, and 112d in the lower end portion in the drawing of the optical modulation element 102 (the left end of the optical modulation element 102 in FIG. 2B), which are disposed in the vicinity of a side (modulator-side edge 212) of the relay substrate 118 on the upper side of FIG. 2A (the right side of the relay substrate 118 in FIG. 2B) by, for example, metal wires 206a, 206b, 206c, and 206d respectively.

Meanwhile, the conductor patterns 202a, 202b, 202c, and 202d provided on the relay substrate 118 can be constituted using a well-known line structure as a signal line for radio frequencies such as a microstrip line, a coplanar line, or a grounded coplanar line, and a ground pattern can also be provided on the relay substrate 118 according to the structure (not illustrated). In addition, the ground pattern is connected to conductor patterns (not illustrated) on the FPC 106 or external ground lines via the conductive package case 104 and, according to the related art, is connected to patterns for grounding (not illustrated) on the optical modulation element 102 by means of wire bonding or the like.

Due to the above-described constitution, for example, radio frequency signals input to the lead pins 116a, 116b, 116c, and 116d from a driving apparatus provided outside the package case 104 (for example, a printed wiring board (PWB) in which a driving circuit is constituted) via the FPC 106 are respectively input to the RF electrodes 112a, 112b, 112c, and 112d on the optical modulation element 102 through the conductor patterns 202a, 202b, 202c, and 202d on the relay substrate 118, and optical modulation operations are carried out in the optical modulation element 102.

Particularly, the present embodiment is constituted so that the width of a disposition range 214 of the conductor patterns 202a, 202b, 202c, and 202d on the relay substrate 118 in a modulator-side edge 212 is narrower than the width of a disposition range 216 of the conductor patterns 202a, 202b, 202c, and 202d in a lead pin-side edge 210. Therefore, it is possible to reduce the total amount of noise power that is coupled to the connection portions between the conductor patterns 202a, 202b, 202c, and 202d in the modulator-side edge 212 and the RF electrodes 112a, 112b, 112c, and 112d out of electromagnetic radiation noise generated from the connection portions between the conductor patterns 202a, 202b, 202c, and 202d in the lead pin-side edge 210 and the lead pins 116a, 116b, 116c, and 116d.

That is, as described in the description of the related art, radio frequency signals which are input to the lead pins 116a, 116b, 116c, and 116d from an external driving circuit and propagated toward the above of FIG. 2B are bent in the connection portions with the conductor patterns 202a, 202b, 202c, and 202d in the lead pin-side edge 210 of the relay substrate 118 so that the propagation direction thereof bends almost at right angles in the right direction in the drawing, which is along the conductor patterns 202a, 202b, 202c, and 202d, and some of the power thereof is radiated in the space and turns into radiation noise in the bent portion.

The above-described radiation noise generally has a solid angle density that attenuates with the distance from noise sources, and the power of radiation noise received by a conductor such as an electrode is proportional to the area of the conductor. Meanwhile, the sensitivity distribution of the conductor receiving radiation noise with respect to the radiation noise, generally, is not within the broadening range (in the area of the conductor seen from the radiation noise source) of the conductor patterns, and has an arch-shaped curve with long tails which exceeds the broadening range on either side. As a result, the conductor actually has a larger effective receiving area than the area of the conductor with respect to radiation noise.

The radiation noise reception power reduction effect in the present embodiment is attributed to the above-described reception sensitivity distribution which has a bell-shaped curve with long tails on either side beyond the area range of the conductor patterns. Specifically, the radiation noise reception power reduction effect is considered to be attributed to the fact that the total effective reception area in which the plurality of conductor patterns receive radiation noise is smaller in a case in which the respective conductor patterns are densely disposed adjacent to one another so that the effective reception areas overlap one another than a case in which the conductor patterns are scattered so that the conductor patterns are apart from one another and the effective reception areas do not overlap one another.

Therefore, the reduction effect of the total power of radiation noise received by the conductor patterns in the modulator-side edge depends on gaps d between the conductor patterns in the modulator-side edge and gaps L between the conductor patterns in the lead pin-side edge, and, according to the finding by the inventors of the invention of the present application, a more sufficient reduction effect can be obtained than in the constitution of the related art as long as the gaps d are in a range of smaller than 50% of L. For example, it is possible to set d in a range of 1 to 2 mm and L in a range of 2.5 to 5 mm, and, in the relay substrate 118 in the present embodiment, L is set to 2.5 mm, and d is set to 1 mm which is approximately 40% of L. Furthermore, even in a case in which the gaps L between the conductor patterns in the lead pin-side edge are further decreased in order to further reduce the sizes, the gaps d between the conductor patterns in the modulator-side edge are selected from a range of smaller than 50% of L.

Here, it is needless to say that radiation noise generated from the lead pins 116a, 116b, 116c, and 116d also reaches the conductor patterns 202a, 202b, 202c, and 202d in a section from the lead pin-side edge 210 to the modulator-side edge 212; however, particularly, the vicinities of the modulator-side edge 212 are interface portions of the optical modulation element 102 with the RF electrodes and portions in which, as radio frequency transmission lines, impedance mismatch is likely to be caused and which is easily affected by radiation noise, and thus the disposition range 214 of the conductor patterns in the modulator-side edge 212 being constituted as described above enables the enhancement of the radiation noise resistance of the relay substrate 118 as a whole.

Meanwhile, in the present embodiment, all of the gaps between the conductor patterns 202a, 202b, 202c, and 202d in the modulator-side edge 212 are set to the same value d, and all of the gaps between the conductor patterns 202a, 202b, 202c, and 202d in the lead pin-side edge 210 are set to the same value L, but the constitution is not limited thereto, and, when the optical modulator is constituted so that at least one of the gaps between the conductor patterns in the modulator-side edge 212 is smaller than at least one width of the widths of the gaps between the conductor patterns in the lead pin-side edge, it is possible to enhance the resistance to radiation noise in the same manner as described above.

In addition, in the present embodiment, regarding the locational relationship between the disposition range 214 and the disposition range 216, the disposition ranges are located so that the central lines of the disposition ranges 214 and 216 in the width direction coincides with each other. However, the constitution is not limited thereto, and it is possible to dispose the disposition ranges 214 and 216 so as to have an arbitrary locational relationship as long as the sizes of the gaps between the conductor patterns 202a, 202b, 202c, and 202d in the modulator-side edge 212 are constituted according to the above-described conditions.

Next, modification examples of the present embodiment will be described using FIG. 3, FIG. 4, FIG. 5, and FIG. 6. Relay substrate s described below can be used in the optical modulator 100 instead of the relay substrate 118.

[First Modification Example]

First, a first modification example of the relay substrate 118 which can be used in the optical modulator 100 illustrated in FIG. 1 will be described.

In the present modification example illustrated in FIG. 3, the disposition range of the conductor patterns in the modulator-side edge is included in a range of the modulator-side edge corresponding to the disposition range of the conductor patterns in the lead pin-side edge (that is, in the range of a projected disposition range obtained by projecting the disposition range of the conductor patterns in the lead pin-side edge to the modulator-side edge) in the same manner as in the relay substrate 118 illustrated in FIG. 2A; however, particularly, one end portion of the disposition range of the conductor patterns in the modulator-side edge is disposed at a location in the modulator-side edge corresponding to one end portion of the disposition range of the conductor patterns in the lead pin-side edge.

FIG. 3 is a view illustrating the constitution of a relay substrate 300 according to the present modification example which can be used instead of the relay substrate 118 using a local detail portion corresponding to FIG. 2A. In FIG. 3, the same constituent elements as the constituent elements of the relay substrate 118 illustrated in FIG. 2A will be represented by the same reference sign in FIG. 2A, and the above description regarding FIG. 2A will be incorporated.

The relay substrate 300 illustrated in FIG. 3 includes, instead of the conductor patterns 202a, 202b, 202c, and 202d in the relay substrate 118 illustrated in FIG. 2A, conductor patterns 302a, 302b, 302c, and 302d which are disposed in a different manner from the above-described conductor patterns. In addition, a disposition range 314 of these conductor patterns in the modulator-side edge 212 is disposed so that an end portion of the disposition range 314 on the right side of the drawing comes to a location corresponding to an end portion of the disposition range 216 of the conductor patterns in the lead pin-side edge 210 on the right side of the drawing. Meanwhile, the sizes of the gaps between the conductor patterns 302a, 302b, 302c, and 302d in the disposition range 314 are the same as the sizes of the gaps between the conductor patterns 202a, 202b, 202c, and 202d in the disposition range 214.

Therefore, in the relay substrate 300 according to the present modification example, the end portion of the disposition range 314 of the conductor patterns 302a, 302b, 302c, and 302d is disposed at an end portion of the range of the modulator-side edge 212 corresponding to the disposition range 216 of the lead pin-side edge 210, and thus the average distance from the locations of the lead pins 116a, 116b, 116c, and 116d as noise sources to the disposition range 214 in the modulator-side edge 212 increases, and, out of radiation noise generated from the lead pins 116a, 116b, 116c, and 116d, the total power of noise received in the disposition range 314 further decreases compared with the case of the disposition range 214 in the relay substrate 118.

[Second Modification Example]

Next, a second modification example of the relay substrate 118 which can be used in the optical modulator 100 illustrated in FIG. 1 will be described.

In the present modification example illustrated in FIG. 4, unlike the relay substrate 118, the disposition range of the conductor patterns in the modulator-side edge is disposed outside a range in the modulator-side edge corresponding to the disposition range of the conductor patterns in the lead pin-side edge.

FIG. 4 is a view illustrating the constitution of a relay substrate 400 according to the present modification example which can be used instead of the relay substrate 118 using a local detail portion corresponding to FIG. 2A. In FIG. 4, the same constituent elements as the constituent elements of the relay substrate 118 and peripheral portions thereof illustrated in FIG. 2A will be represented by the same reference sign in FIG. 2A, and the above description regarding FIG. 2A will be incorporated.

The relay substrate 400 illustrated in FIG. 4 has a width in the horizontal direction of the drawing which is wider than the relay substrate 118 illustrated in FIG. 2A. A lead pin-side edge 410, a modulator-side edge 412, and a disposition range 416 of the present relay v 400 respectively correspond to the lead pin-side edge 210, the modulator-side edge 212, and the disposition range 216 of the present relay substrate 118.

The relay substrate 400 has the same constitution as the relay substrate 118, but includes, instead of the conductor patterns 202a, 202b, 202c, and 202d, conductor patterns 402a, 402b, 402c, and 402d which are disposed in a different manner from the above-described conductor patterns. In addition, a disposition range 414 of these conductor patterns in the modulator-side edge 412 is provided in a region outside a range in the modulator-side edge corresponding to the disposition range 416 of the conductor patterns in the lead pin-side edge 410.

Therefore, in the relay substrate 400 according to the present modification example, the average distance from the locations of the lead pins 116a, 116b, 116c, and 116d as noise sources to the disposition range 414 in the modulator-side edge 412 is further increased than in the case of the disposition range 314 illustrated in FIG. 3, whereby it is possible to further reduce the power of noise received by the disposition range 414.

Figure 5:
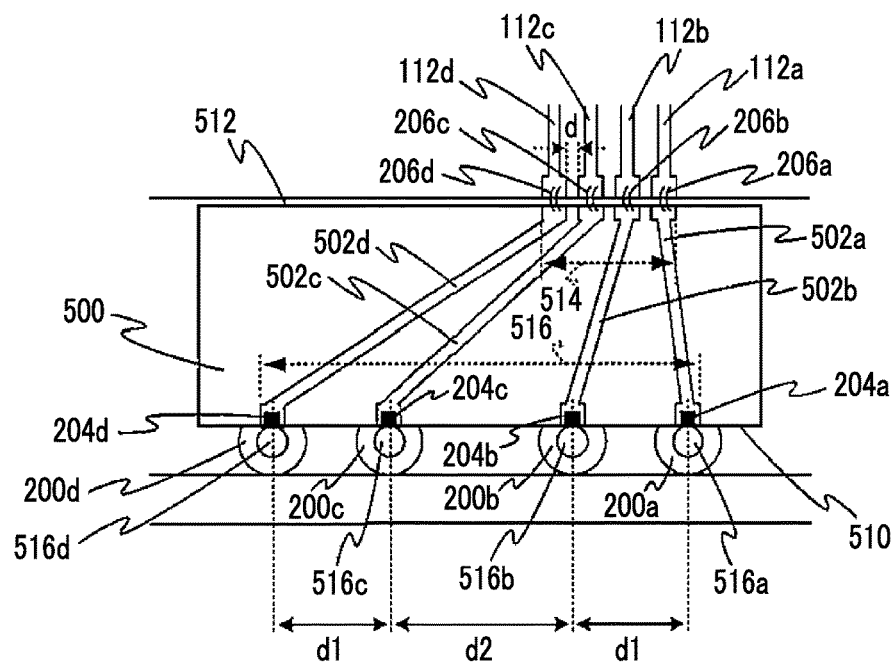
FIG. 5 is a view illustrating a first example of another constitution of the relay substrate in the optical modulator according to the first embodiment illustrated in FIG. 2A.
Figure 6:
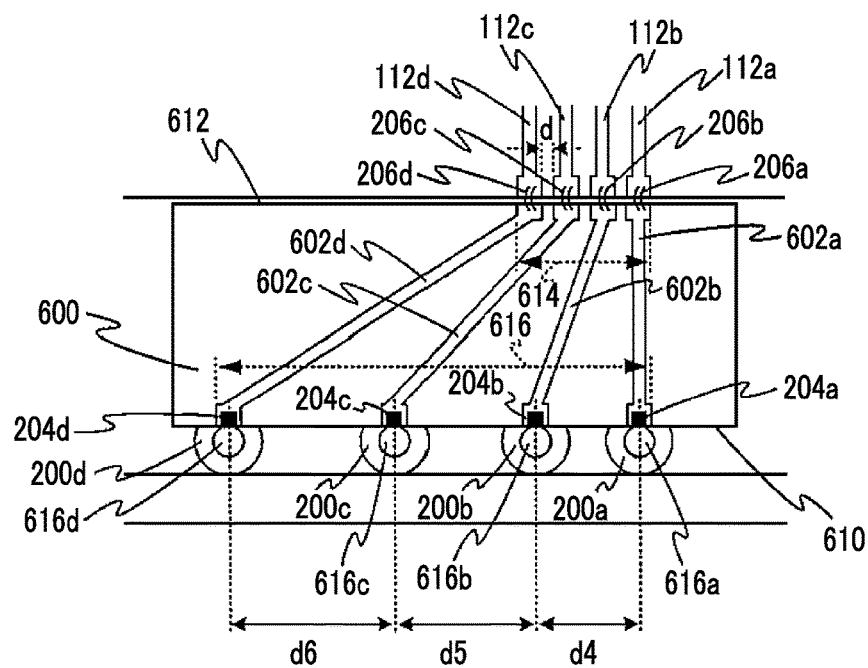
FIG. 6 is a view illustrating a second example of another constitution of the relay substrate in the optical modulator according to the first embodiment illustrated in FIG. 2A.

Meanwhile, in the embodiments and the modification examples described above, the lead pins 116a, 116b, 116c, and 116d are disposed at equal intervals, but the lead pins may be disposed at unequal intervals. In this case, the relay substrate can be constituted as illustrated in FIG. 5 and FIG. 6. Relay substrate s 500 and 600 illustrated in FIG. 5 and FIG. 6 can be used in optical modulators having the same constitution as the optical modulator 100 except for the different dispositions of the lead pins.

FIG. 5 illustrates an example in which lead pins 516a and 516b and lead pins 516c and 516d are apart from each other as much as a distance d1 and the lead pins 516b and 516c are apart from each other as much as a distance d2 that is different from the distance d1. In addition, conductor patterns 502a, 502b, 502c, and 502d are disposed in a disposition range 516 in a lead pin-side edge 510 so as to correspond to the locations of the lead pins 516a, 516b, 516c, and 516d. The sizes of gaps between the conductor patterns 502a, 502b, 502c, and 502d in a disposition range 514 which is provided in a modulator-side edge 512 of the relay substrate 500 can be set to be the same as the sizes of the gaps between the conductor patterns 202a, 202b, 202c, and 202d in the disposition range 214 which is provided in the modulator-side edge 212 of the relay substrate 118.

Meanwhile, FIG. 6 illustrates an example in which lead pins 616a and 616b, lead pins 616b and 616c, and lead pins 616c and 616d are apart from each other as much as mutually different distances d4, d5, and d6. In addition, in the relay substrate 600, conductor patterns 602a, 602b, 602c, and 602d are disposed in a disposition range 616 in a lead pin-side edge 610 so as to correspond to the locations of the lead pins 616a, 616b, 616c, and 616d. The sizes of gaps between the conductor patterns 602a, 602b, 602c, and 602d in a disposition range 614 which is provided in a modulator-side edge 612 of the relay substrate 600 can be set to be the same as the sizes of the gaps between the conductor patterns 202a, 202b, 202c, and 202d in the disposition range 214 which is provided in the modulator-side edge 212 of the relay substrate 118.

Due to the constitution as illustrated in FIG. 5 or FIG. 6, it is possible to localize the peak of the power distribution of radiation noise in the modulator-side edge of the relay substrate. Therefore, it is possible to forma place with a lower power level in the power distribution of the radiation noise than in a case in which the lead pins are disposed at equal intervals, and thus it is possible to produce a constitution capable of further reducing the influence of radiation noise.

<Second Embodiment>

Next, a second embodiment of the present invention will be described. The present embodiment is an optical transmission apparatus equipped with the optical modulator 100 described in the first embodiment (or the optical modulator including the relay substrate according to anyone of the modification examples or constitutional examples illustrated in FIG. 3, FIG. 4, FIG. 5, and FIG. 6).

Figure 7:
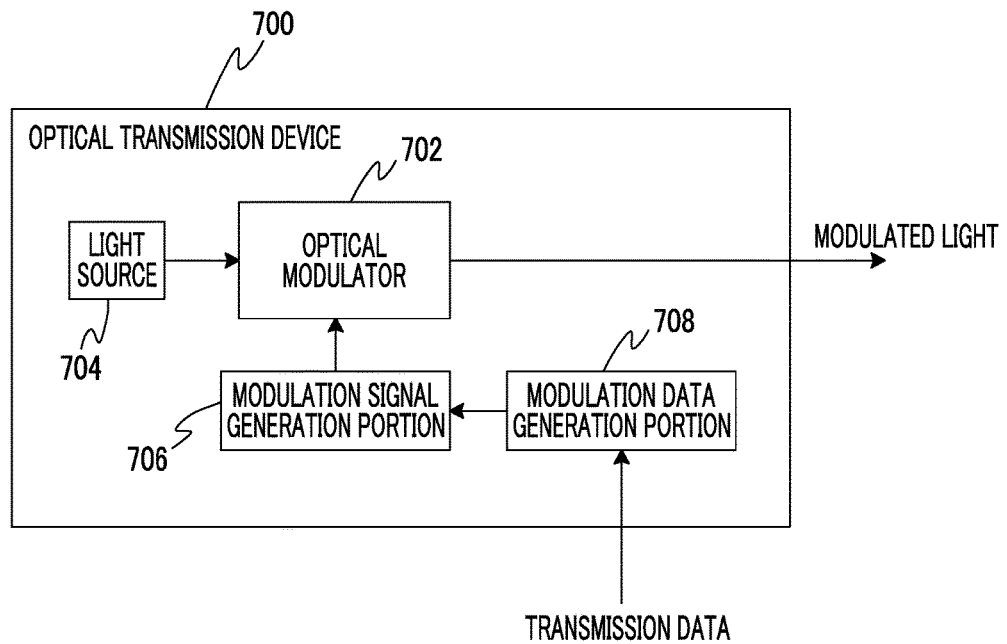
FIG. 7 is a view illustrating a constitution of an optical transmission apparatus according to a second embodiment of the present invention.
Figure 8A:
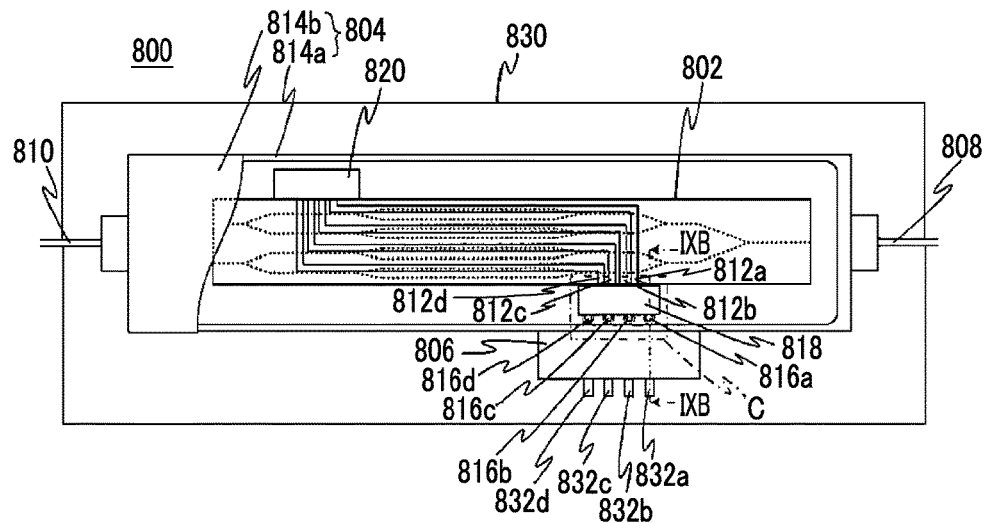
FIG. 8A is a plan view of an optical modulator of the related art illustrating a constitution of the optical modulator.
Figure 8B:
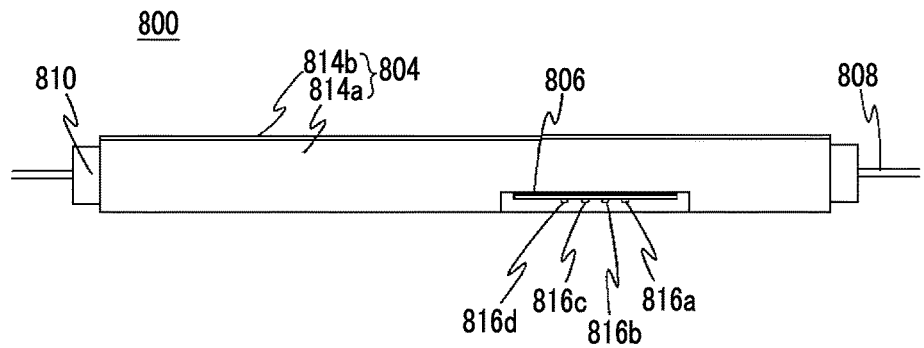
FIG. 8B is a side view of the optical modulator of the related art illustrating the constitution of the optical modulator.
Figure 8C:
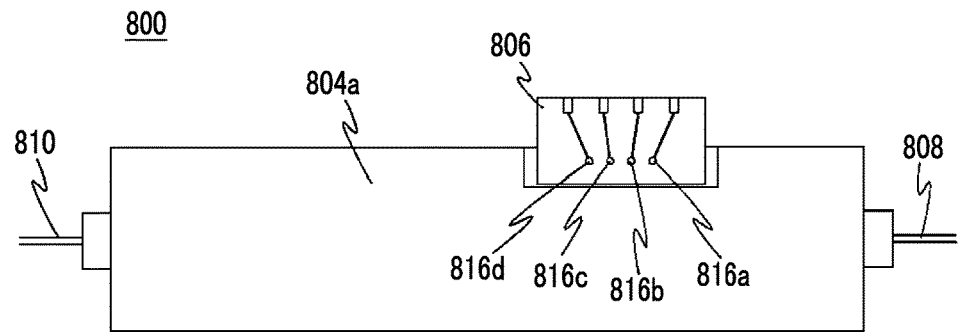
FIG. 8C is a bottom view of the optical modulator of the related art illustrating the constitution of the optical modulator.
Figure 9A:
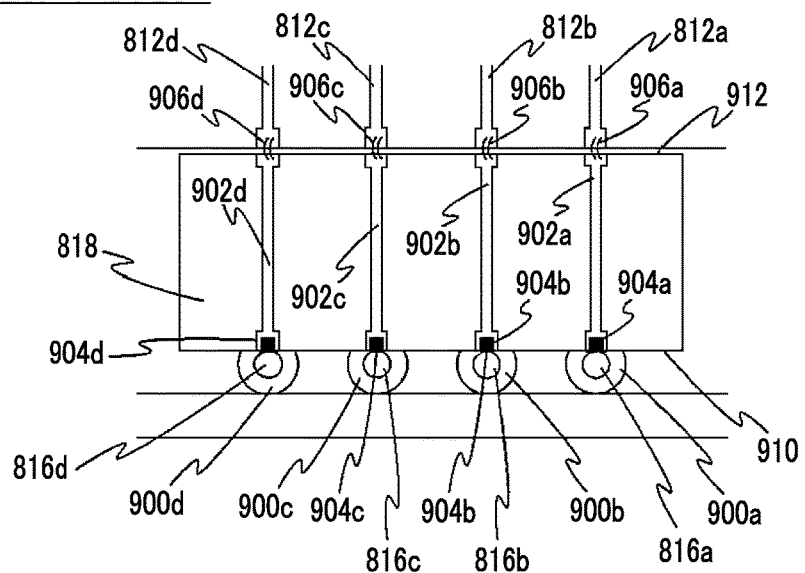
FIG. 9A is a partial detail view of a C portion of the optical modulator illustrated in FIG. 8A.
Figure 9B:
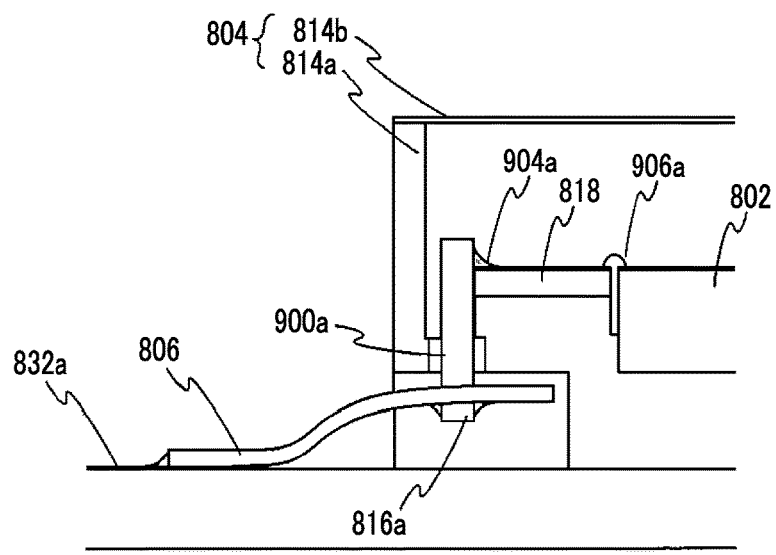
FIG. 9B is a cross-sectional view of the optical modulator in a direction of a IXB-IXB line in FIG. 8A.

FIG. 7 is a view illustrating the constitution of the optical transmission apparatus according to the present embodiment. A present optical transmission apparatus 700 has an optical modulator 702, a light source 704 making light incident on the optical modulator 702, a modulation signal generation portion 706, and a modulation data generation portion 708.

The optical modulator 702 is the optical modulator 100 illustrated in FIG. 1 (which may include the relay substrate according to any one of the modification examples or constitutional examples illustrated in FIG. 3, FIG. 4, FIG. 5, and FIG. 6 instead of the relay substrate 118). The modulation data generation portion 708 receives transmission data that are supplied from the outside, generates modulation data for transmitting the transmission data (for example, data obtained by converting or processing transmission data to a predetermined data format), and outputs the generated modulation data to the modulation signal generation portion 706.

The modulation signal generation portion 706 is an electronic circuit that outputs electrical signals for causing modulation operation in the optical modulator 702, generates modulation signals which are radio frequency signals for causing optical modulation operations according to the modulation data in the optical modulator 702 on the basis of the modulation data output by the modulation data generation portion 708, and inputs the modulation signals to the optical modulator 100. The modulation signals are made up of four RF signals corresponding to the four RF electrodes 112a, 112b, 112c, and 112d on the optical modulation element 102 in the optical modulator 100.

The four RF signals are input to the lead pins 116a, 116b, 116c, and 116d in the optical modulator 100 via the FPC 106 and are respectively applied to the RF electrodes 112a, 112b, 112c, and 112d via the relay substrate 118 (which may be the relay substrate according to any one of the modification examples or constitutional examples illustrated in FIG. 3, FIG. 4, FIG. 5, and FIG. 6).

Therefore, light output from the light source 704 is modulated by the optical modulator 100, turns into modulated light, and is output from the optical transmission apparatus 700.

Particularly, in the present optical transmission apparatus 700, since the optical modulator 100 having the above-described constitution is used, it is possible to effectively prevent radiation noise generated in the bent portion (that is, the portion in which the propagation direction of the radio frequency signals is bent almost at right angles from the lead pins 116a, 116b, 116c, and 116d toward the corresponding conductor patterns provided in the relay substrate 118 or the like) of the propagation path of radio frequency signals (RF signals) in the optical modulator 100 from being received by the conductor patterns provided in the relay substrate 118 or the like and affecting optical modulation operations and effectively prevent the consequent deterioration of the transmission characteristics of modulated optical signals.

Meanwhile, in the respective embodiments described above, the optical modulators including the optical modulation element which has the substrate made of LN and four RF electrodes have been described, but the present invention is not limited thereto and can also be applied in the same manner to optical modulators having more or less (a plurality of) RF electrodes and optical modulators in which materials other than LN are used for substrates.

What is claimed is:

1. An optical modulator comprising:
   an optical modulation element including a plurality of signal electrodes;
   a plurality of lead pins for inputting radio frequency signals; and
   a relay substrate in which conductor patterns that electrically connect the lead pins with the signal electrodes are formed,
   wherein the relay substrate is accommodated in a package case of the optical modulator,
   the relay substrate and the optical modulation element are separated from each other,
   the plurality of lead pins and the conductor patterns are connected at a substantially right angle and form a signal radiating portion,
   the conductor patterns and the signal electrodes are connected with wire bonding and form a radiation noise receiving portion, and
   the optical modulator is constituted so that at least one of widths of gaps between the plurality of conductor patterns in an optical modulator-side edge of the relay substrate is smaller than at least one width of widths of gaps between the plurality of conductor patterns in a lead pin-side edge.

2. The optical modulator according to claim 1,
   wherein the widths of the gaps between the plurality of conductor patterns in the optical modulator-side edge of the relay substrate are smaller than 50% of the widths of the gaps between the plurality of conductor patterns in the lead pin-side edge.

3. The optical modulator according to claim 1,
wherein the relay substrate is constituted so that a central line of a disposition range of the conductor patterns in the optical modulator-side edge of the relay substrate coincides with a central line of a disposition range of the conductor patterns in the lead pin-side edge of the relay substrate.

4. The optical modulator according to claim 1,
wherein, in the relay substrate, the disposition range of the conductor patterns in the optical modulator-side edge of the relay substrate is included in a range of the optical modulator-side edge corresponding to the disposition range of the conductor patterns in the lead pin-side edge of the relay substrate, and one end portion of the disposition range in the lead pin-side edge is disposed at a location in the lead pin-side edge corresponding to one end portion of the disposition range in the optical modulator-side edge.

5. The optical modulator according to claim 1,
wherein, in the relay substrate, a part of the disposition range of the conductor patterns in the optical modulator-side edge of the relay substrate is provided outside a range of the optical modulator-side edge corresponding to the disposition range of the conductor patterns in the lead pin-side edge of the relay substrate.

6. The optical modulator according to claim 1,
wherein, in the relay substrate, all of the disposition range of the conductor patterns in the optical modulator-side edge of the relay substrate is provided outside the range of the optical modulator-side edge corresponding to the disposition range of the conductor patterns in the lead pin-side edge of the relay substrate.

7. The optical modulator according to claim 1,
wherein a width of the disposition range of the plurality of conductor patterns in the optical modulator-side edge of the relay substrate is 50% or less of a width of the disposition range of the plurality of conductor patterns in the lead pin-side edge of the relay substrate.

8. The optical modulator according to claim 1,
wherein the plurality of lead pins are disposed at equal intervals or unequal intervals.

9. An optical transmission apparatus comprising:
the optical modulator according to claim 1; and
an electronic circuit that outputs electrical signals for causing the optical modulator to perform modulation operations.

10. The optical modulator according to claim 1,
wherein the plurality of lead pins and the conductor patterns are connected with solder.

\* \* \* \* \*